Dec. 23, 1952  A. VAN DUYN  2,622,869
SCALE
Filed Sept. 8, 1947  4 Sheets-Sheet 1

Inventor
Adrianus Van Duyn
By: Spencer, Marzall, Johnston & Cook
Attys

Dec. 23, 1952  A. VAN DUYN  2,622,869
SCALE

Filed Sept. 8, 1947  4 Sheets-Sheet 2

Inventor
Adrianus Van Duyn
By Spencer, Marzall, Johnston + Cook
attys

Dec. 23, 1952     A. VAN DUYN     2,622,869
SCALE

Filed Sept. 8, 1947     4 Sheets-Sheet 4

Inventor
Adrianus Van Duyn
By Spencer, Marzall, Johnston & Cook
Attys

Patented Dec. 23, 1952

2,622,869

UNITED STATES PATENT OFFICE 2,622,869

SCALE

Adrianus van Duyn, Hillegersberg, Rotterdam, Netherlands, assignor to U. S. Slicing Machine Company, Inc., La Porte, Ind., a corporation of Indiana Application September 8, 1947, Serial No. 772,641
In Great Britain October 3, 1946

8 Claims. (Cl. 265—68)

1

This invention relates to weighing apparatus of the kind having a rotary-drum chart, a commodity support above the drum, and a weighing beam below the drum axis and supporting the commodity support.

An object of the invention is to provide weighing apparatus of the aforesaid kind, which is compact without the loading capacity of the apparatus being adversely affected.

According to the invention, in weighing apparatus of the aforesaid kind, the commodity support is pivotally mounted on the beam, and has downwardly extending brackets or legs spaced from each other in the direction of the drum axis and accommodating the drum between them. Preferably, the drum axis extends above the beam transversely of the pivotal axis of the beam.

Further according to the invention, the weighing apparatus comprises a rotary-drum chart, a commodity support above the drum, a weighing beam below the drum axis and supporting the commodity support, the drum axis extending above the beam transversely of the pivotal axis of the beam, and the commodity support being pivotally mounted on the beam and having downwardly extending brackets or legs spaced from each other in the direction of the drum axis and accommodating the drum between them, load counter-balancing means adapted to operate on movement of the beam under load, and a drive for the drum, whereby movement of the beam under load effects corresponding rotation of the drum.

In order that the invention may be clearly understood, an embodiment of the invention will now be described by way of example with reference to the accompanying drawings, in which Figure 1 is a front view, partly in section, illustrating the application of the invention to a weighing scale of the kind having a rotary-drum chart, a commodity receiver above the drum axis, and a weighing beam below the drum axis and supporting the commodity receiver.

Figure 1:
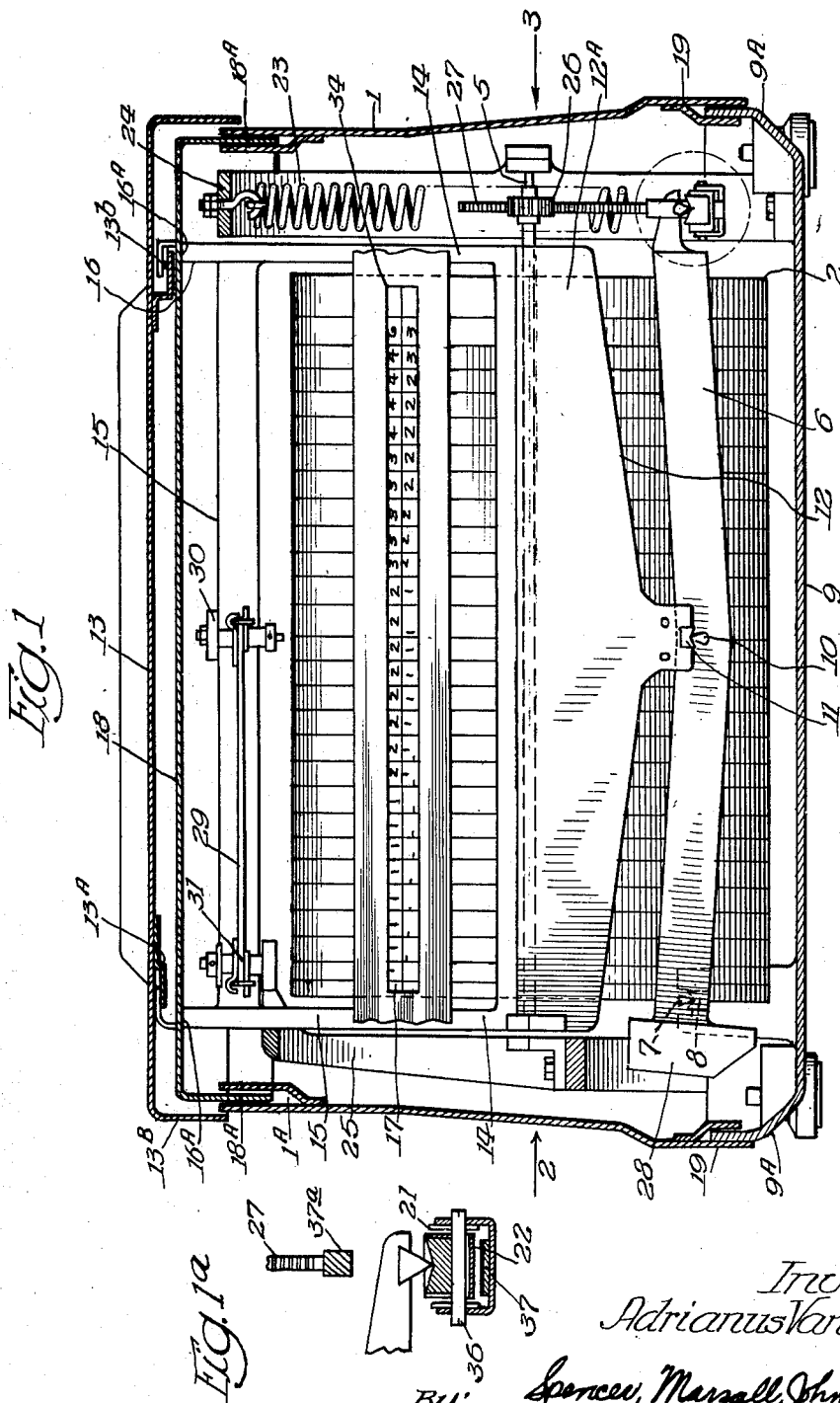
Figure 1A is an enlarged fragmentary view, partly in section, of the portion of Figure 1 showing the knife bearing for the scale beam.

Referring to the drawings:

The weighing scale comprises a box-like casing 1, a rotatable-drum chart 2 with its spindle 5 journaled in end frames 24, 25 screwed to the base 9, a window 3 for observation of the chart (weight and price indications) by the salesman, and a window 4 for observation of the chart (weight indications) by the buyer.

Figure 3:
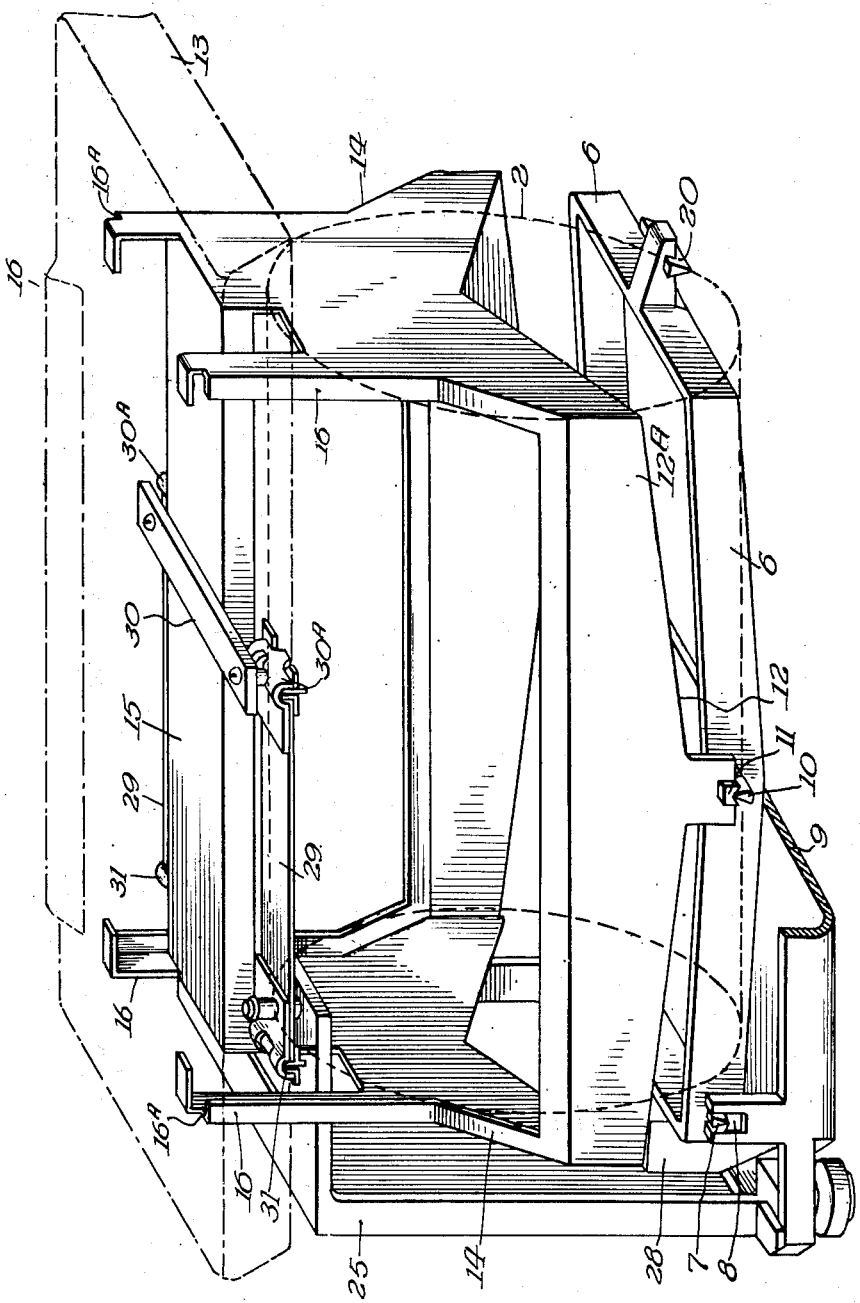
Figure 3 is a diagrammatic perspective view.

The beam 6 of the weighing scale is located beneath the axis of the drum spindle 5, and is in the form of a rectangular frame surrounding the drum (Figure 3). That is, the beam has a pair of longitudinal members parallel to the drum axis, and a pair of end members at right angles to the drum axis.

The beam is fulcrumed at one end by knife edges 7 on bearings 8 upstanding from the base 9 of the casing, the knife edges being located at the ends of the longitudinal members.

It will be clear that the drum axis extends above the beam 6 transversely of the pivotal axis 7 of the beam.

Figure 4:
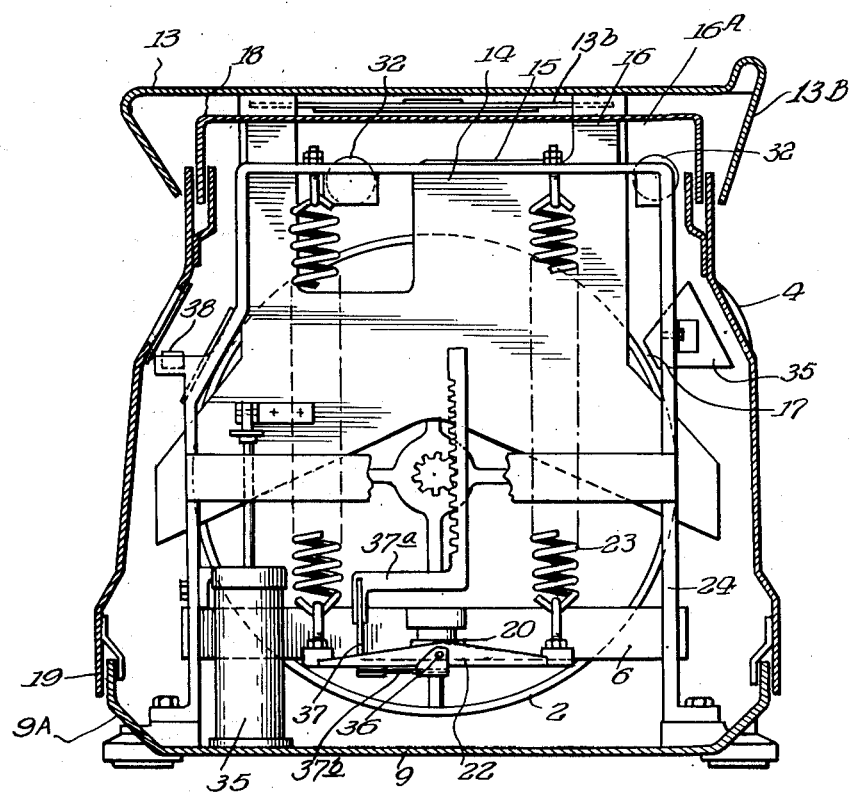
Figure 4 is a diagrammatic side view in the direction of arrow 3, Figure 1.

The commodity support includes a commodity receiver 13 located over the drum 2, and a carrier 12 on which the receiver is detachably mounted and which is pivotally mounted on the beam. The carrier 12 is in the form of a rectangular frame surrounding the drum, the longitudinal members 12A of the frame having bearings 11 intermediate their ends engaging knife edges 10 intermediate the ends of the longitudinal members of the beam. The end members 14 of the frame constitute downwardly extending brackets or legs spaced from each other in the direction of the drum axis and accommodating the drum between them. The upper ends of the brackets 14 are provided with four spaced pillars 16 having horizontally flanged upper ends on which the commodity receiver 13 is detachably mounted by means of two hooking plates 13A screwed to the under side of the receiver 13, and a spring wire 13b. To mount the receiver in position, the right-hand hooking plate 13A (Fig. 1) and the wire 13b are located under the adjacent flanges of the pillars, the left-hand hooking plate 13A is located under its adjacent flanges, and the receiver is then adjusted horizontally until it occupies its correct position. The upper ends of the brackets 14 are interconnected by a platform 15 which is located below the commodity receiver 13, and has a bar 30 secured to its upper face. A pair of check links 29 are fulcrumed at 30A to the ends of the bar 30, and extend to the end frame 25, where they are fulcrumed at 31, said links insuring parallel motion of the carrier during oscillation of the beam. A dash pot 35 (Figure 4) is connected to the bracket 14 of the carrier 12.

The pillars 16 of the carrier are formed with ledges 16A on which is placed a closure 18 for the top of the casing 1. The closure 18 has a continuous depending flange 18A at its edges, and the casing 1 has a continuous recess 1A at its upper edges. The flange 18A projects within the recess 1A, and is freely movable therein so that dirt, dust or other extraneous matter is effectively excluded from the interior of the scale. Further dust-proofing is effected by providing a continuous depending flange 13B on the receiver 13, said flange extending close to the exterior of the casing 1. The casing 1 has, at its lower edge, a continuous recess 19 which engages the upstanding walls 9A of the scale base 9.

The weighing beam 6 carries, on the end member remote from the fulcrum, a knife edge 20 which rests on a bearing 21 pivotally mounted on a pin 36 carried by a link 22, to the ends of which the lower ends of coil tension springs 23 are anchored. The upper ends of the springs 23 are anchored to the end frame 24.

When the receiver 13 is loaded, the drum 2 is driven by means of a rack 27 engaging a pinion 26 on the drum spindle 5. The rack 27 is carried by a U-arm which includes the connecting portion 37 and legs 37a and 37b and which is pivotally connected to the pivot pin 36 of the bearing 21.

The weighing beam 6 carries a weight 28 at the opposite side of the fulcrum 7, 8 from the load-receiving side of the beam, the weight serving to hold the knife edges 7 on their bearings 8.

Figure 2:
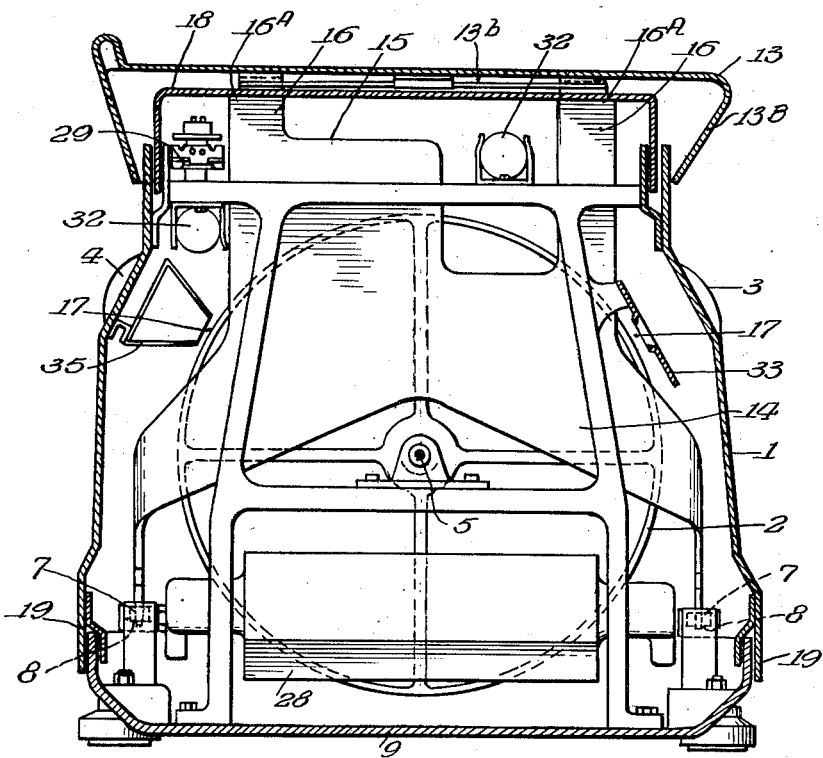
Figure 2 is a side view, partly in section, in the direction of arrow 2, Figure 1.

For lighting the interior of the scale, a pair of electric bulbs 32 are provided (Figure 2). A plate 33 having a slot 34 and a wire 17 to enable the salesman to read off the weight indications and the prices, is provided between the window 3 and the drum chart 2, and is screwed to the end frames 24 and 25. Between the window 4 and the drum chart 2 is mounted a tubular member 35 which enables reading of the weight of the commodity by the buyer. A water-level 38 is provided on the end frame 24.

It will be clear that in the scale described the accommodation of the drum between the spaced legs of the support, and the location of the drum immediately over the beam and with its axis at right angles to the beam's pivotal axis, enables the construction of a very compact scale which occupies a minimum of open counter space, while the capacity of the scale remains unaffected.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A weighing apparatus embodying a frame, a rotary-drum chart, a commodity support above the drum, a weighing beam below the drum axis, load counterbalancing means supporting said beam upon said frame, and means pivotally mounting said commodity support intermediate the ends thereof directly upon said beam, said commodity support embodying downwardly diverging brackets spaced from each other in the direction of the axis of the drum, said drum being disposed between said brackets.

2. A weighing apparatus embodying a frame, a rotary-drum chart, a commodity support above the drum, a weighing beam below the drum axis, load counterbalancing means supporting said beam upon said frame, and means pivotally mounting said commodity support intermediate the ends thereof directly upon said beam, said commodity support embodying downwardly diverging brackets spaced from each other in the direction of the axis of the drum, said drum being disposed between said brackets, the axis of said drum being disposed transverse to the pivotal axis of said beam.

3. A weighing apparatus embodying a frame, a rotary-drum chart, a commodity support above the drum, a weighing beam below the drum axis, means pivotally mounting said commodity support intermediate the ends thereof directly upon said beam, said commodity support embodying downwardly diverging brackets spaced from each other in the direction of the axis of the drum, said drum being disposed between said brackets, load counterbalancing means supporting said beam upon said frame adapted to operate on movement of the beam under stress of a load, and a drive for the drum whereby movement of the beam under load effects a corresponding rotation of the drum.

4. Weighing apparatus embodying an upstanding frame, a rotary-drum chart, a weighing beam below the axis of the drum, load counter-balancing means supporting said beam upon said upstanding frame, a commodity support embodying a rectangular frame having spaced longitudinal members and between the ends of which the drum is disposed, said rectangular frame embodying downwardly diverging brackets at the end thereof, means pivotally mounting the rectangular frame by the longitudinal members and intermediate the ends thereof upon said beam, a commodity receiver at the upper ends of said brackets, a closure plate at the upper ends of the brackets below said commodity receiver, and check links connecting the closure plate with the casing of the apparatus, to insure parallel motion of the commodity support.

5. Weighing apparatus embodying an upstanding frame, a rotary-drum chart, a weighing beam below the axis of the drum, load counterbalancing means supporting said beam upon said upstanding frame, a commodity support embodying a rectangular frame having spaced longitudinal members and between the ends of which the drum is disposed, said rectangular frame embodying downwardly diverging brackets at the end thereof, means pivotally mounting the rectangular frame by the longitudinal members and intermediate the ends thereof upon said beam, a commodity receiver at the upper ends of said brackets, a closure plate at the upper ends of the brackets below said commodity receiver, and check links connecting the closure plate with the casing of the apparatus, to insure parallel motion of the commodity support, the said beam embodying a substantially rectangular frame surrounding the drum.

6. A weighing apparatus embodying a frame, a rotary-drum chart, a commodity support above the drum, a weighing beam below the drum axis, load counterbalancing means supporting said beam upon said frame, means pivotally mounting said commodity support intermediate the ends thereof upon said beam, said commodity support embodying downwardly diverging brackets spaced from each other in the direction of the axis of the drum, said drum being disposed between said brackets, knife edge bearings fulcruming one end of said beam, and a weight provided on the beam at the opposite side of the fulcrum from the load-receiving side of the beam, said weight serving to hold the knife edges in their bearings.

7. A weighing apparatus embodying a frame, a rotary-drum chart, a commodity support above the drum, a weighing beam below the drum axis, means pivotally mounting said commodity support intermediate the ends thereof directly upon said beam, said commodity support embodying downwardly diverging brackets spaced from each other in the direction of the axis of the drum, said drum being disposed between said brackets, load counterbalancing means supporting said beam upon said frame, and a gear and rack driving connection between the beam and said drum.

8. A weighing apparatus embodying a frame, a rotary-drum chart, a commodity support above the drum, a weighing beam below the drum axis, load counterbalancing means supporting said beam upon said frame, and means pivotally mounting said commodity support intermediate the ends thereof directly upon said beam, said commodity support embodying downwardly diverging brackets spaced from each other in the direction of the axis of the drum and extending below the drum axis, said drum being disposed between said brackets, both the said commodity support and said beam being of a frame-like construction encompassing said drum.

ADRIANUS van DUYN.

REFERENCES CITED

The following references are of record in the file of this patent:

UNITED STATES PATENTS

| Number | Name | Date |
|---|---|---|
| 1,853,199 | Bryce | Apr. 12, 1932 |
| 2,063,712 | Von Pein | Dec. 8, 1936 |
| 2,128,148 | Jaenichen | Aug. 23, 1938 |
| 2,182,590 | King | Dec. 5, 1939 |
| 2,287,814 | Meeker et al. | June 30, 1942 |
| 2,341,226 | Marshall et al. | Feb. 8, 1944 |